(12) United States Patent
Zheng et al.

(10) Patent No.: US 9,582,570 B2
(45) Date of Patent: Feb. 28, 2017

(54) MULTILINGUAL MIXED SEARCH METHOD AND SYSTEM

(71) Applicant: Alibaba Group Holding Limited, George Town (KY)

(72) Inventors: Wei Zheng, Hangzhou (CN); Feng Lin, Hangzhou (CN); Huaxing Jin, Hangzhou (CN); Li Sun, Hangzhou (CN); Qingfu Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 205 days.

(21) Appl. No.: 13/915,378

(22) Filed: Jun. 11, 2013

(65) Prior Publication Data

US 2013/0339378 A1    Dec. 19, 2013

(30) Foreign Application Priority Data

Jun. 13, 2012   (CN) .......................... 2012 1 0194972

(51) Int. Cl.
*G06F 17/30*       (2006.01)

(52) U.S. Cl.
CPC .............................. *G06F 17/30669* (2013.01)

(58) Field of Classification Search
CPC .......... G06F 17/30427; G06F 17/3043; G06F 17/30669

(Continued)

(56) References Cited

U.S. PATENT DOCUMENTS

| 7,584,216 | B2 | 9/2009 | Travieso et al. |
| 7,890,493 | B2 | 2/2011 | Chen |

(Continued)

FOREIGN PATENT DOCUMENTS

| JP | 2006179019 | 7/2006 |
| JP | 2008546051 | 12/2008 |

(Continued)

OTHER PUBLICATIONS

Kim, Taewan, et al. "FromTo-CLIRTM: web-based natural language interface for cross-language information retrieval." 1999, Information Processing and Management, Edit/vol. 35.4, pp. 559-586.*

(Continued)

*Primary Examiner* — James Trujillo
*Assistant Examiner* — Jessica N Le
(74) *Attorney, Agent, or Firm* — Van Pelt, Yi & James LLP

(57) ABSTRACT

Embodiments of the present application relate to a multilingual mixed search method, a system for multilingual mixed searching, and a computer program product for multilingual mixed searching. A multilingual mixed searching method is provided. The method includes receiving a query word entered by a user and identifying source language of the query word, translating the query word from the source language to query words of a plurality of target languages, the plurality of target languages being different than the source language, using the query word in a corresponding target language as a basis for searching an index of web page information corresponding to the corresponding target language and obtaining web page information in the corresponding target language, from the web page information obtained from the index corresponding to the corresponding target language, and translating the obtained web page information from the corresponding target language to the source language.

11 Claims, 17 Drawing Sheets

(58) Field of Classification Search
USPC .......................................................... 707/760
See application file for complete search history.

(56) References Cited

U.S. PATENT DOCUMENTS

| | | | |
|---|---|---|---|
| 8,306,968 B2 | 11/2012 | Chiba et al. | |
| 8,346,613 B2 | 1/2013 | Raygoza | |
| 8,510,102 B2 | 8/2013 | Kaida | |
| 8,799,275 B2 | 8/2014 | Peng et al. | |
| 9,418,139 B2 | 8/2016 | Moulinier et al. | |
| 2002/0156688 A1* | 10/2002 | Horn | G06Q 10/087 705/14.51 |
| 2003/0149687 A1* | 8/2003 | Brown et al. | 707/3 |
| 2005/0086214 A1* | 4/2005 | Seewald | G06F 17/30669 |
| 2005/0108200 A1 | 5/2005 | Meik et al. | |
| 2007/0250494 A1* | 10/2007 | Peoples | G06F 17/30669 |
| 2009/0083243 A1* | 3/2009 | Heymans et al. | 707/4 |
| 2009/0125497 A1* | 5/2009 | Jiang et al. | 707/4 |
| 2009/0144280 A1* | 6/2009 | Su | G06F 17/30669 |
| 2009/0287671 A1* | 11/2009 | Bennett | 707/4 |
| 2011/0314005 A1 | 12/2011 | Guo | |
| 2012/0185496 A1* | 7/2012 | Magdy | G06F 17/30669 707/760 |
| 2012/0278302 A1* | 11/2012 | Choudhury | G06F 17/30669 707/709 |
| 2013/0055098 A1 | 2/2013 | Bennett | |

FOREIGN PATENT DOCUMENTS

| | | |
|---|---|---|
| JP | 2009032292 | 2/2009 |
| JP | 2009157458 | 7/2009 |
| JP | 2011221951 | 11/2011 |
| JP | 2012069059 | 4/2012 |

OTHER PUBLICATIONS

Kim, Taewan, et al. "FromTo-CLIRTM: web-based natural language interface for cross-language information retrieval." Inf. Process, Manage. 35.4 (1999): 559-586.

Baeza-Yates, Ricardo, and Berthier Ribeiro-Neto "Modern information retrieval". vol. 463. New York: ACM press, 1999. pp. 163-190.

Gudivada, Venkat N., et al. "Information retrieval on the world wide web." Internet Computing, IEEE 1.5 (1997): 58-68.

Lee, Dik L., Huei Chuang, and Kent Seamons. "Document ranking and the vector-space model." Software, IEEE 14.2 (1997): 67-75.

* cited by examiner

410 — CALCULATE FIRST TRANSLATION WEIGHT FOR TRANSLATING QUERY WORD FROM SOURCE LANGUAGE TO QUERY WORDS IN VARIOUS TARGET LANGUAGES

810 — ACQUIRE SECOND TRANSLATION WEIGHTS FOR TRANSLATIONS OF WEB PAGE INFORMATION IN VARIOUS TARGET LANGUAGES INTO SOURCE LANGUAGE

1010 — REMOVE WEIGHTS FROM WEB PAGE INFORMATION WHOSE IDENTIFIER CHARACTERISTIC DOMAINS ARE THE SAME AS WEB PAGE INFORMATION

MULTILINGUAL MIXED SEARCH METHOD AND SYSTEM

CROSS REFERENCE TO OTHER APPLICATIONS

This application claims priority to People's Republic of China Patent Application No. 201210194972.X entitled A MULTILINGUAL MIXED SEARCH METHOD AND SYSTEM, filed Jun. 13, 2012 which is incorporated herein by reference for all purposes.

FIELD OF THE INVENTION

The present application relates to a multilingual mixed search method and system.

BACKGROUND OF THE INVENTION

With the growing reach of networks, network information resources have become increasingly abundant, and user demand for network information resources has steadily increased. However, while network information resources have been increasing, an obstacle to the widespread sharing of these network information resources by users exists relating to a plurality of languages. Research on multilingual information retrieval (MLIR) has begun to address the obstacle.

In a conventional example using Spanish and English, initially, the full texts of English documents are translated into Spanish documents. Indices corresponding to Spanish are established from the translated Spanish documents together with original Spanish documents. At the same time, the full texts of Spanish documents are translated into English documents. Then indices corresponding to English are established from the translated English documents together with original English documents. When there are English language query words, the English query words are searched in the indices corresponding to English, and the search results are obtained and returned. When there are Spanish language query words, the Spanish query words are searched in the indices corresponding to Spanish, and the search results are obtained and returned.

Conventionally, the first step is, for any language A therein, to translate documents from other languages into language A and establish indices together. The result is a bloated system architecture and hardware equipment, which is difficult to maintain or to expand. Secondly, for any language A therein, after the full texts of documents in the other languages have been conventionally translated into documents in language A, these documents are searched for query words in language A. Because a great variation among the rules of the various languages exists, semantic information from the original documents is lost during translation. In addition, the more documents that are translated, the greater the possible loss of semantic information will be. Thus, searches conducted based on full-text translations inevitably lack sufficient precision.

BRIEF DESCRIPTION OF THE DRAWINGS

Various embodiments of the invention are disclosed in the following detailed description and the accompanying drawings.

FIG. 4 is a flow chart illustrating an embodiment of a translation of a query word from a source language to a query word of various target languages process.

FIG. 8 is a flow chart illustrating an embodiment of an acquisition of web page information translated from a target language to a source language process.

FIG. 10 is a flow chart illustrating an embodiment of a sending of web page information to a user in accordance with a ranking process.

DETAILED DESCRIPTION

Figure 1:
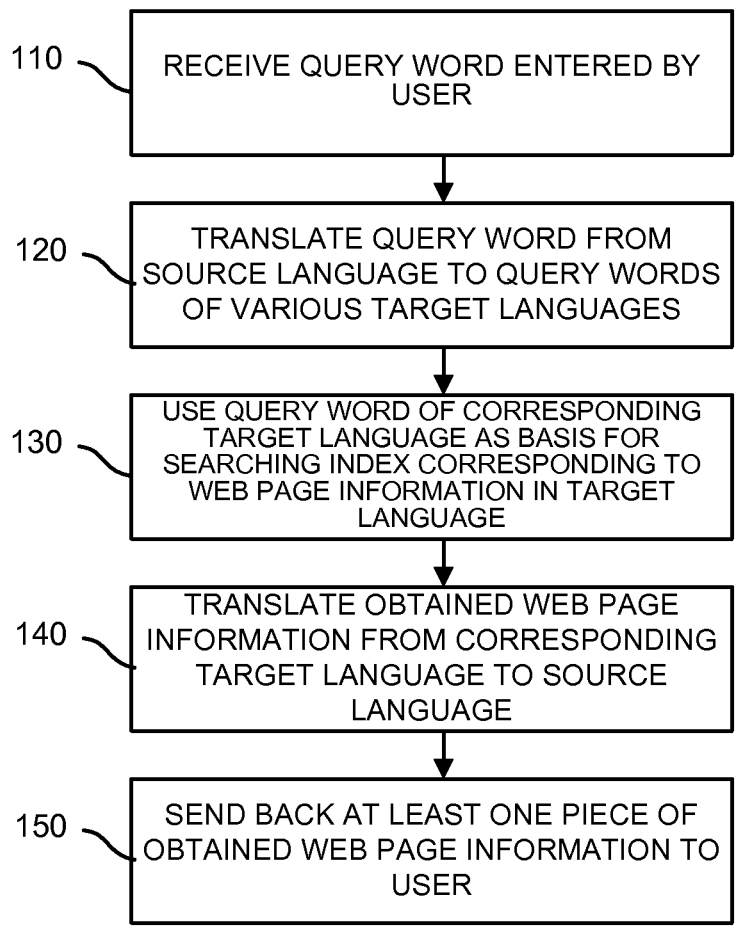
FIG. 1 is a flow chart illustrating an embodiment of a multilingual mixed search process.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, for web page information of each language, an index is established for the web page information in that language alone. Query words of a user, which are in a certain language, are translated into query words of other languages. The query words in various languages are separately entered into indices of the corresponding other languages and information queries are then conducted. The relevant web page information is then extracted from the query results. The relevant web page information is then translated and sent back to the user. The multilingual mixed search method of the present application can be expanded easily. The multilingual mixed search method lays a foundation for multilingual mixed search platforms for achieving mixed searching and mixed ranking of different data objects. By simplifying indexing architecture, the simplified index architecture reduces the hardware equipment needed to build a system, also reduces translation volume by eliminating conventional reliance on full text translation in the search process, and reduces information loss that result from the full text translation. Furthermore, the simplified indexing architecture reduces translation information loss relating to information that has no obvious context and thus increases search result accuracy.

FIG. 1 is a flow chart illustrating an embodiment of a multilingual mixed search process. The process 100 can be implemented on a server 1310 of FIG. 13. The process 100 includes:

In 110, the server receives a query word entered by a user and identifies a source language of the query word.

As an example, the user enters query words, and the server determines the source language of the entered query words. For example, a Spanish user enters query words reproductor mp3. The query words are determined to be Spanish. In some embodiments, the client device knows the language a user enters. For example, a user is entering English now, but if the user wanted to enter Chinese, the user switches the language setting of the computer.

In 120, the server translates the query word from the source language to query words of various target languages. The various target languages are languages different than the source language. For example, the server translates the Spanish language query words entered by the user into eight different languages, such as Korean, Japanese, etc., and the eight different languages do not include Spanish.

In 130, the server uses a query word of each target language as a basis for searching an index corresponding to web page information in the each target language and obtains web page information in the each corresponding language.

After the server translates the query word from the source language to the query words of the various target languages, the query word has been translated into eight different languages. For each language, a set of indices is established.

In some embodiments, the index corresponding to the web page information is different for each language. For example, one index corresponding to the English language is different from an index corresponding to the Chinese language. Because the indices are different, the obtained web page information in the each corresponding language can be different. For example, different languages have different linguistic forms, and therefore, small differences in the page display and index exist.

In 140, from the web page information obtained from the index corresponding to the each target language, the server translates the obtained web page information from corresponding target language to the source language.

In 150, the server sends back at least one piece of the obtained web page information to the user.

In some embodiments, indices are pre-established for web page information in various languages. The web page information may be product information in the e-commerce field. The product information corresponds to, for example, a table describing a particular product and has subject, attributes, etc. For example, in the event that web page information is in four languages (English, French, Chinese and Japanese), a separate index is pre-established for the web page information in each of the four languages. These indices do not interfere with each other.

In some embodiments, indices are pre-established corresponding to the various languages of the web page information. Similar to the above product information index, four product information indices for the four languages are established. In some embodiments, an index cluster is constructed for the appropriate languages and provides query services for this type of index. In some embodiments, each language index is only used to search in that language. For example, for Spanish query words, only the Spanish index is suitable for search.

Figure 2:
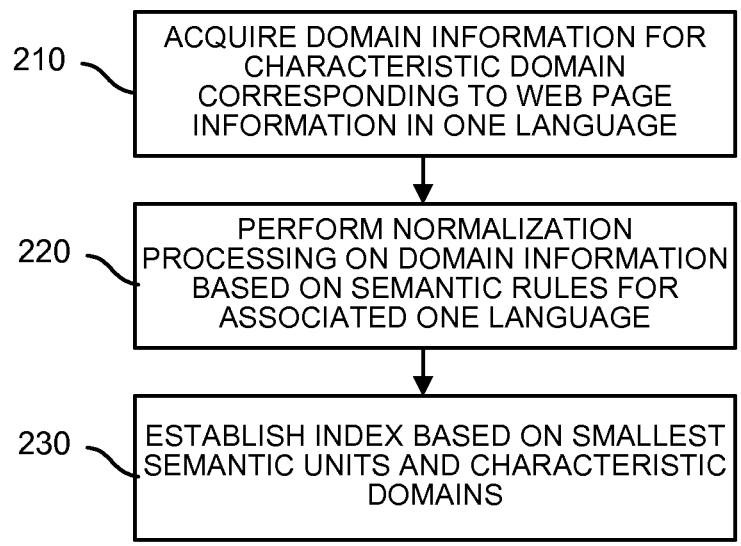
FIG. 2 is a flow chart illustrating an embodiment of an establishing of an index process.

FIG. 2 is a flow chart illustrating an embodiment of an establishing of an index process. The process 200 can be implemented by the server 1310 of FIG. 13 and comprises:

In 210, the server acquires domain information for a characteristic domain corresponding to the web page information in one language.

A characteristic domain is structured information including a key and a value such as, for example, table 1, which describes information about the product via different dimensions. In some embodiments, the characteristic domain includes descriptions of characteristic attributes, pictures, etc.

The process 200 increases search accuracy and efficiency for structured information. For example, e-commerce search objects are examples of structured information. Thus, the web page information is product information or, in another example, detailed descriptions of products of sellers. The detailed descriptions have special structures. General search index establishing and searching methods have relatively poor search accuracy with respect to this kind of structured information. As discussed above, the conventional search method translates product information in other languages into product information in one language to establish search indices. In other words the index for each language corresponds to an index for product information translated from one language. Moreover, conventionally, translation basically entails lengthy textual content with relatively complete context. However, when text lacking context is translated, ambiguities may arise, and if a search is performed on the results of the translation of the text lacking context, the search results are going to be inaccurate.

In some embodiments, the web page information corresponds to product information. For example, characteristic domains of a seller's products' product information include: product information title (title), product information ID, product information keywords, product information attributes, product information categories, general description of the product information, detailed description of the product information, etc. Each field of the product information represents a characteristic domain.

Table 1 illustrates descriptive segments from one piece of English-language product information:

TABLE 1

| Title of characteristic domain | Domain information |
|---|---|
| Id | 267526767 |
| gmt_create | 1258306586 |
| gmt_modified | 1307495391 |
| company_id | 200249113 |
| have_image | Y |
| Title | plastic bottle |
| Keywords | plastic bottle, pet plastic bottle, liquid packaging bottle |
| category_id | 230603 |
| Description | Plastic bottle Capacity: 500 ml Neck: 24/410 H: 185 mm Qty: 216 pcs/ctn Meas: 62 * 42 * 64.5 cm |
| attr_desc | Plastic Type: PET Use Shampoo: Industrial Material: Plastic Sealing Type: Pump Sprayer |

In some embodiments, the web page information is extended to other structured information having various kinds of characteristic domains. The characteristic domains have no limits.

In 220, with regard to the domain information for each characteristic domain, the server performs a normalization processing on the domain information based on semantic rules for the associated one language, and obtains the smallest semantic unit in the one language. The smallest semantic unit is understood as a word or a phrase in English.

In some embodiments, the language of the domain information is subjected to a series of treatments. The series of treatments includes pre-processing, word segmentation, reduction to root words, or any combination thereof. The pre-processing treatment includes character encoding of the language, conversion from upper to lower case, removal of special characters, removal of invisible characters, or any combination thereof. In some embodiments, the domain information exists in various forms in the background. For example, after pre-processing, title="plAstic bottlE #?! $@" becomes title="plastic bottle." After undergoing word segmentation, the domain information becomes title=[plastic][bottle]. By reducing the domain information to root words, the domain information becomes title=[plastic][bottl]. In some embodiments, to facilitate storage, hash calculations are performed on the processing results to convert the domain information to a hash ID. Thus, after conversion to word hash ID, the title=[plastic][bottle] becomes title=[3439954953][1533389829].

Each language has its own semantic rules. Therefore, each language has different processing rules. For example, in Spanish, after the domain information title="El algodón, hilado del T/C teñió tela del cheque 44/5" is pre-processed, the domain information becomes title=el algodón, hilado del t/c teñió tela del cheque 44/5. The word segmentation result is title=[el algodón][hilado][del][t/c][teñió][tela][del][cheque][/44/5]. With pure numerals filtered out, the domain information is title=[el algodón][hilado][del][t/c][teñió][tela][del][cheque]. With accents removed, the domain information becomes title=[el algodon] [hilado] [del] [t/c] [teio] [tela] [del] [cheque]. When reduced to root words, the domain information becomes title=[el algodon] [hil] [del] [t/c] [te] [tel] [del] [chequ].

For each language, the processing rules are carried out in accordance with the language's linguistic rules. The linguistic rules impose no restrictions.

Lastly, in some embodiments, each smallest semantic unit of Spanish is converted, using a hash function, to a hash ID to establish an index. In other words, the hash function assigns a number to each word. An example of a hash function is MD5. Establishing the index directly with the smallest semantic units is possible.

In 230, the server establishes an index based on the smallest semantic units and the characteristic domains. As an example, assuming many (key, value) pairs describing the product exist, the (key, value) pairs represent the domain. Each value individually establishes an index, and forms a domain index from the smallest semantic units and the characteristic domains.

Based on the normalized smallest semantic units, the server establishes an index for the characteristic domains. For example, using the above product information, the server generates an index including the characteristic domains including product title, product ID, product keywords, product attributes, and product categories. In other words, a present language index for product information that is in various languages can be obtained. For example, in the event that English-language product information and Spanish-language product information are present, an English index is established for the English product information, and a Spanish index is established for the Spanish product information. Translation of the English product information into Spanish product information and then combining the translated Spanish product information with original Spanish product information to establish Spanish product information is no longer necessary.

In some embodiments, the hash IDs of the smallest semantic units is used to establish indices. In the event that the hash IDs of the smallest semantic units are used to establish the indices, the server processes the various query word, and subjects the query word to a uniform hash computation to search the index composed of hash IDs. In some embodiments, a hash function changes the index into hash IDs to store the text index in a different form.

Figure 3:
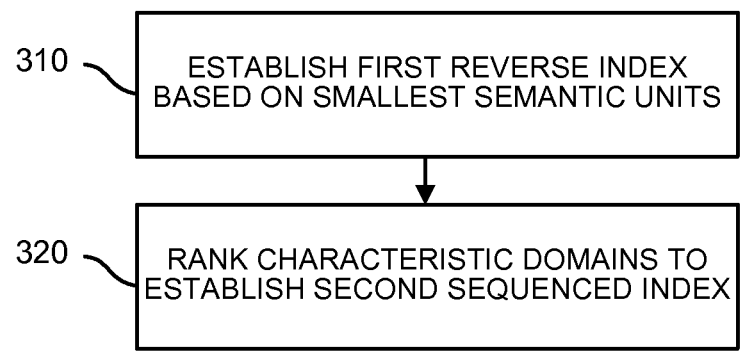
FIG. 3 is a flow chart illustrating an embodiment of an establishing of an index based on a smallest semantic unit and a characteristic domain process.

FIG. 3 is a flow chart illustrating an embodiment of an establishing of an index based on a smallest semantic unit and a characteristic domain process. The process 300 is an implementation of operation 230 and comprises:

In 310, the server establishes a first reverse index based on smallest semantic units. For a query word, the first reverse index is used to preliminarily screen web page information related to the query word. The reverse index can also be known as an inverted index.

In other words, the establishing of the first reverse index uses the smallest semantic unit obtained through the processing described above as search units to construct the first search index used during online queries. The server directly searches all relevant web page information based on the smallest semantic unit of the query word.

The first reverse index is established based on different domain characteristics of the web page information. The establishment of the first reverse index is a precondition to a course online ranking selection. For example, after the above product information undergoes pre-processing, word segmentation, and other such processing based on product ID, product category, product title, product keywords, product summary, and other such domains, a different index is established for each domain. Subsequently, a multi-domain index is established. In other words, two ranking strategies are employed. The first ranking strategy is a course ranking entailing selecting a relatively small candidate set from a vast data set using character string matching and other algorithms. The course ranking strategy allows a rapid selection of candidate sets. The second ranking strategy is a fine ranking entailing performing a more meticulous ranking within the selected candidate sets from the course ranking strategy.

In 320, the server uses the characteristic domains and the smallest semantic unit in the corresponding characteristic domains to rank the characteristic domains to establish a second sequenced index. The second sequenced index is used to screen the web page information from the preliminary screening.

The second sequenced index includes the characteristic domains and the smallest semantic units in the corresponding characteristic domains organized according to a certain sequence. For example, in the product information, product ID, product category, and product title are organized based on the amount of memory they occupy in a computer. The product information, product ID, product category, and product title is used to introduce the second sequenced index.

In the event that quality scores exist for product information in each target language, in other words, quality scores have been computed for product information, the product information quality scores can be stored in a sequenced index. In some embodiments, the product information quality scores are obtained according to the following: $Score_1 = F1(f'_1, \ldots, f'_n)$. $f'_1 \ldots f'_n$ each represent a characteristic of the product. The product information quality scores take into consideration product title (title characteristic domain), keywords (keyword characteristic domain), attributes, or any combination thereof. In some embodiments, a linear regression model is used to fit the curve. F1 indicates the model function for information quality, and the product information's score is $Score_1$.

In addition, if commercial weights exist for the sellers corresponding to the product information, in other words, there are seller commercial scores, the seller commercial scores are also stored in the sequenced index. The seller commercial scores are obtained as follows: $Score_2 = F2(f''_1, \ldots, f''_n)$. $F''_1 \ldots f''_n$ each represent a characteristic of the product. Seller commercial scores are similar to product information quality scores and correlation scores in their training and forecasting.

The process 300 helps to reduce the scope of searches and conserve system search resources. For example, as a preliminary step, a wide-range index is constructed. Thus, when performing a search, the server directly carries out a query word matching based on preliminary selections of all query word related web page information. Subsequently, an index based on all the characteristic domains and the smallest semantic units in the corresponding characteristic domains is constructed. Thus, during the search, the first reverse index reduces the scope of data for a finer search. In the event that the fine search is conducted based on the characteristic domains and the smallest semantic units in the corresponding characteristic domains, the server is limited to selections within a small scope and the search does not need to be applied to the full index. Thus, search resources are conserved.

Based on the established indices, the process 100 comprises:

In 110, the server receives a query word entered by the user and identifies a source language of the query word.

To facilitate subsequent processing, the server identifies the source language of the query word entered by the user.

After the user enters the query word, the server receives the query word entered by the user. In some embodiments, the server adds a marker bit based on some user information to indicate which language the query word is in, in other words, the marker bit indicates the source language of the query word. In some embodiment, the identification of the source language is made based on the user's IP address. For example, in the event that query words entered by the user is "v-cuello vestido de novia," and the user has an IP address corresponding to Spain, the server's identification result for the "v-cuello vestido de novia" is query=v-cuello vestido de novia&language=es where the added "es" indicates that the source language of the query words is Spanish. In the event that the query words entered by the user are "v-neck wedding dress," and the user has an IP address corresponding to Great Britain, the server's the identification result for "v-neck wedding dress" is query=v-neck wedding dress&language=en, where "en" indicates that the source language of the query words is English.

In some embodiments, the server also provides the user with an option to select the source language. The server identifies the source language of the query words entered by the user based on the user's selection. In some embodiments, the server identifies the source language via another method.

In 120, the server translates the query word from the source language to query words of various target languages. The various target languages are languages other than the source language.

To conduct a search on different language index servers or server groups, the server translates the user's query word from the source language to query words in various target languages.

For example, the query words entered by the user described above are "v-cuello vestido de novia." The system identifies the query words as Spanish. The system has indices for web page information in Chinese, English, French, and other such languages. Thus, "v-cuello vestido de novia" needs to be translated into query words in these languages. For example, "v-cuello vestido de novia" is translated into the English "v-neck wedding dress."

As for the query words in the source language, the query words do not need to be translated, but they can be directly entered in the source language search group for searching.

FIG. 4 is a flow chart illustrating an embodiment of a translation of a query word from a source language to a query word of various target languages process. The process 400 is an implementation of operation 120 and comprises:

In 410, the server calculates a first translation weight for translating the query word from the source language to query words in the various target languages.

In some embodiments, when query words are translated into query words of a certain language, a translation quality of the query words is calculated. In other words, translation quality entails calculating the accuracy of a translated text with the help of language models and dictionaries to obtain a confidence level. For example, "v-cuello vestido de novia" is translated into the English "v-neck wedding dress." In some embodiments, the first translation weight is calculated when "v-cuello vestido de novia" is translated into the English "v-neck wedding dress."

In 130, the server searches indices corresponding to web page information in various languages based on the query words of the various languages, and obtains web page information in the corresponding various languages.

Figure 5:
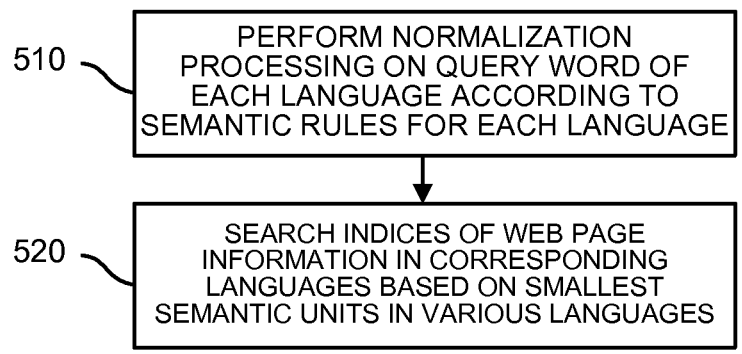
FIG. 5 is a flow chart illustrating an embodiment of a search corresponding to query words in each language process.

In some embodiments, the searches of the indices subjects query words translated into each language and query words in the source language to pre-processing. An example of the pre-processing includes normalization processing. FIG. 5 is a flow chart illustrating an embodiment of a search corresponding to query words in each language process. The process 500 is an implementation of operation 130 and comprises:

In 510, the server performs a normalization processing on the query word of the each language according to the semantic rules for the each language, and obtains the smallest semantic unit in the each language.

Because of differences in voice, syntax, and coding for each language, the pre-processing varies for each language. Examples of pre-processing include encoding processing, upper to lower case conversion, garbage character processing, improper character processing special character processing, division into sentences, division into words, reduction to word root, elimination of tones, etc.

Using Spanish as an example: query words are "red mp3 player": q="rojO ?? reprodUctor de mp3". After pre-processing, the query words undergo word segmentation to become: "rojo /reproductor de mp3/". After word segmentation, the results are reduced to word roots, for example, "rojo /reproductor de mp3/" becomes "roj reproductor de mp3".

In an example using English: query words are q="RED mp3 $$$ @@ pLayeR &&***^M". After pre-processing, the query words undergo word segmentation to become: q="red mp3 player".

In 520, the server searches indices of web page information in the corresponding languages based on the smallest semantic units in the various languages, and obtains web page information in the corresponding languages.

Then, the server searches the web page information in the indices based on the obtained smallest semantic units.

Figure 6:
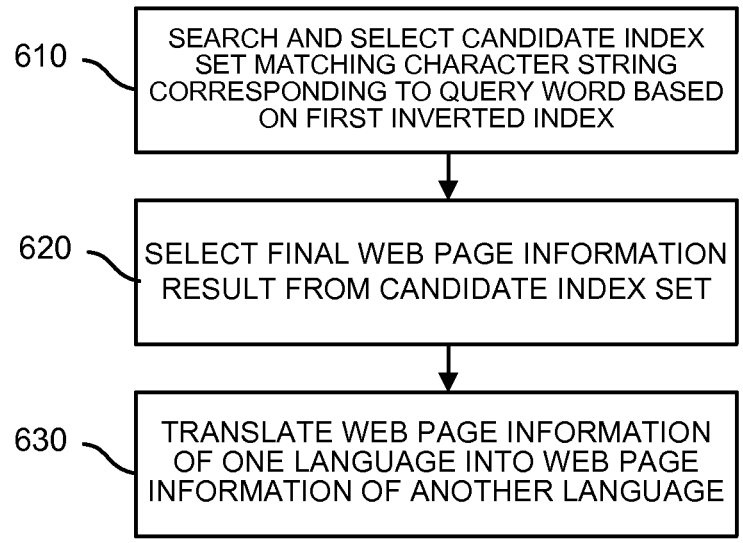
FIG. 6 is a flow chart illustrating an embodiment of a search of an index of web page information process.

FIG. 6 is a flow chart illustrating an embodiment of a search of an index of web page information process. The process 600 is an implementation of 520 and comprises:

In 610, the server searches and selects a candidate index set matching character string corresponding to the query word based on the first reverse index.

In 620, the server selects a final web page information result from the candidate index set.

Operations 610 and 620 make use of the above described operations 310 and 320, where indices are established based on the smallest semantic units and the characteristic domains.

In 630, the server translates the web page information of one language into web page information of another language and stores the web page information in the other language, so that after the search results are found, the relevant web page information translated into the source language from the other language is extracted and then presented to the source language user, enabling the source language user to browse the extracted relevant web page information.

Figure 7A:
FIG. 7A is a flow chart illustrating an embodiment of an extraction of the relevant web page information process.

FIG. 7A is a flow chart illustrating an embodiment of an extraction of the relevant web page information process. The process 700 is an implementation of operation 630 and comprises:

In 710, for the web page information in the each language, the server calculates a relevance weight of the web page information and the query word in the corresponding language.

For example, for a user identified as being an English language user, after the user's query words have been translated into Spanish and web page information has been found on a Spanish index, relevance weight of the found Spanish web page information and the Spanish query words is computed. The user is determined to be an English language user based on the IP Address of the user or based on user selection. Correspondingly, Chinese web page information would, for example, have the relevance weight of the Chinese web page information and Chinese query words computed. The relevance weights are calculated in order to rank the web page information when the web page information is sent back to the user.

Figure 7B:
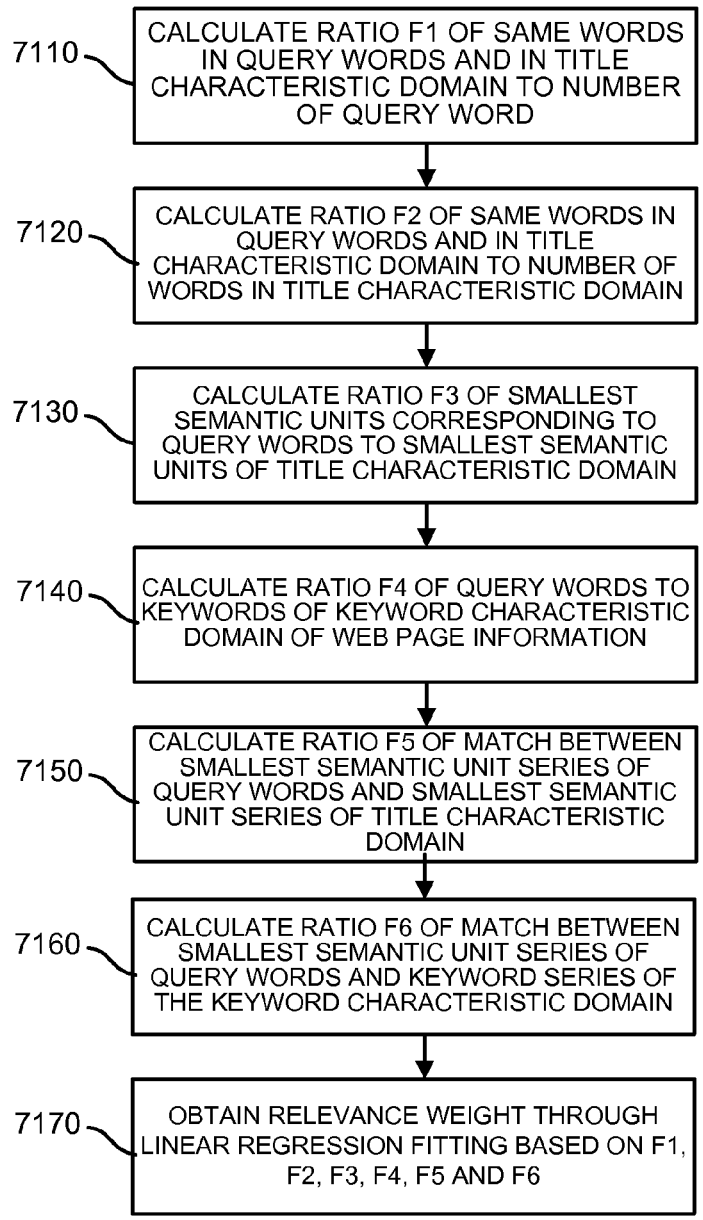
FIG. 7B is a flow chart illustrating an embodiment of a calculation of a relevance weight of a web page information process.

FIG. 7B is a flow chart illustrating an embodiment of a calculation of a relevance weight of a web page information process. The process 710 comprises:

In 7110, the server calculates a ratio f1 of a number of identical words in the query words and in the title characteristic domain of the web page information to a number of query words.

For example, as described above, f1 corresponds to the ratio of the number of words that are the same in the query words and the product description title (the title characteristic domain of the product information) to the number of query words. Using Spanish as an example, query="teléfono móvil" and title="Nokia 5310 teléfono móvil". In this example, the number of words that match completely in the query and the title is 2, the number of query words is 2, and the final characteristic score is 1.

In 7120, the server calculates a ratio f2 of a number of identical words in the query words and in the title characteristic domain of the web page information to a number of words in the title characteristic domain.

For example, in the case of the product information described above, f2 corresponds to the ratio of identical words in the query words and the title in the product description to the number of words in the title. For example, the query words (query)="teléfono móvil" and the title characteristic domain words (title)="Nokia 5310 teléfono móvil." The number of query words that match completely with the title is 2, the number of words in the title is 4, and the final characteristic score is 0.5.

In 7130, the server calculates a ratio f3 of a number of smallest semantic units corresponding to the query words to a number of smallest semantic units of the title characteristic domain.

For example, f3 corresponds to the ratio of number of query words to the number of words in the title including the query words. For example, query="rojo mp3" and title="Rojo 2G mp3". The final score is 0.6.

In 7140, the server calculates a ratio f4 of a number of query words to a number of keywords of the keyword characteristic domain of the web page information.

For example, f4 corresponds to the ratio of number of query words to number of keywords (keywords of the keyword characteristic domain), which includes query words. The keywords correspond to a plurality of product words that sellers use to describe their products when publishing product information. The method of calculating the f4 characteristic is similar to the method of calculating the f1 characteristic. In the event that the query words and the keywords match completely, the result will have a higher characteristic score than when the query words and the keywords do not match completely.

In 7150, the server calculates a match degree f5 between a smallest semantic unit series of the query words and a smallest semantic unit series of the title characteristic domain of the web page information. For example, the smallest semantic unit series for query=red mp3 player, title=8g red mp3 player with battery is red mp3 player. The order is considered as match.

In some embodiments, f5 corresponds to the ratio of the match degree between query words and the title (title characteristic domain) series in the product description. For example, if the title characteristic domain words (title) are "teléfono móvil," and the query words (query) are "teléfono móvil," the series matches completely, and the score is 1.

In 7160, the server calculates a match degree f6 between a smallest semantic unit series of the query words and a keyword series of the keyword characteristic domain of the web page information.

In some embodiments, f6 corresponds to the ratio of the match degree between the query words and the keyword series in the product description. For example, the keywords include "teléfono móvil" "Nokia 5310 teléfono móvil" and "Nokia 5310". If the query words (query) are "teléfono móvil", then the match score is 1.

Values f5 and f6 not only consider character matching between the query and the product, but the values also consider character series. A perfect score is when the character strings match completely, and the character series are completely the same.

In 7170, the server obtains a relevance weight through a linear regression fitting based on f1, f2, f3, f4, f5 and f6.

The determination of the fit for these characteristics, in other words, the characteristic value weight, involves a linear regression model. The relevance score is obtained based on $Score_0=F0(f1, \ldots, f6)$ where f1, f2, ... f6 correspond to the six characteristics described above. F0 corresponds to the model function from linear regression model training $Score_0$, which results from fitting the characteristics above, corresponds to the relevance score.

In 140, from the web page information obtained by indices corresponding to the various target languages, the server acquires web page information translated from the corresponding target languages to the source language.

For example, as discussed above, pre-translated stored web page information that was translated from the various target languages into the source language exists in some cases. Thus, in some embodiments, the acquisition of the web page information includes using search results from web page information that was translated into the source language from various target languages. In some embodiments, the indices are obtained according to one-to-one correspondences between each search result and the translated web page information.

After the indices have been established, web page information in each language is translated into web page information in the other languages and stored so that, after the search results are found, corresponding web page information translated into the source language from web page information in the language of the search results is extracted from the stored information. Subsequently, the search results are displayed to the source language user enabling the source language user to browse the search results. For example, assuming web page information exists in three languages: English, Spanish, and Chinese. After an index for each language is established for the web page of that language, the English web page information is translated into Spanish web page information and Chinese web page information and stored. Please note that, for example, an English webpage is translated into Spanish and Chinese, but that the product information specified by the English language site is translated into other languages such as Spanish and Chinese, and a search uses Spanish and Chinese to complete the search, and displays the result in the user's language. The Spanish web page information is translated into English web page information and Chinese web page information and stored, and the Chinese web page information is translated into English web page information and Chinese web page information and stored. Translations are mutual. For example, Spanish can be translated into English and Chinese, and English can be translated into Spanish and Chinese, etc. For example, if the user is a Chinese-language user, then the query words which he enters are translated into English and Spanish query words. In the event that, in the English index and the Spanish index, the corresponding results are found, the translated Chinese web page information corresponding thereto is extracted and sent to the Chinese-language user.

In some embodiments, in addition, after the search results are obtained, in other words, after web page information in the target language is obtained from a search conducted on the target language index, the server then translates the obtained search results into web page information in the source language and sends the translated search results back to the user terminal.

FIG. 8 is a flow chart illustrating an embodiment of an acquisition of web page information translated from a target language to a source language process. In some embodiments, the process 800 is used to implement 140 of process 100 and comprises:

In 810, the server acquires second translation weights for translations of web page information in the various target languages into the source language.

For example, when web page information in English is translated into web page information in Spanish, the English to Spanish translation quality can be calculated. A translation confidence level of the English to Spanish translation, in other words, the second translation weight, is thus acquired.

For example, assuming that the product information is present in three languages: English, Spanish, and Chinese. The English product information is translated into Spanish product information and Chinese product information and stored. Therefore, second translation weights are separately calculated for Spanish product information and Chinese product information translated from English, and the translation confidence levels of the Spanish product information and Chinese product information translated from English are obtained.

Referring again to FIG. 1, in 150 of process 100, the server sends back at least one piece of the obtained web page information to the user.

Figure 9:
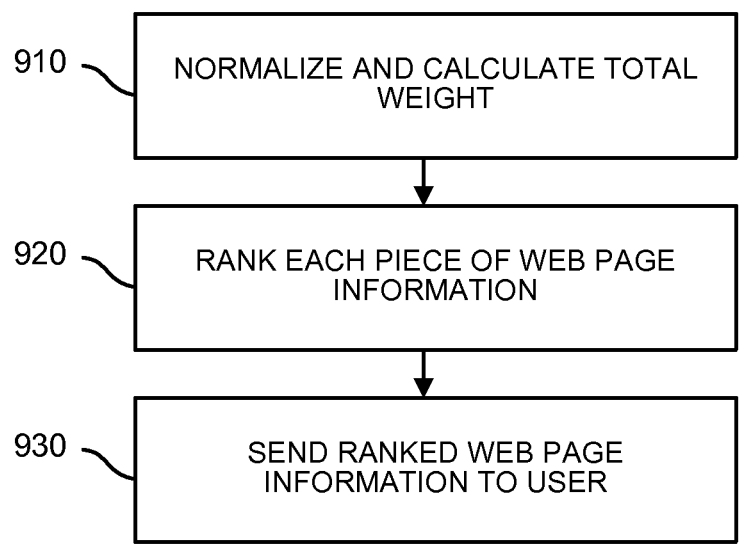
FIG. 9 is a flow chart illustrating an embodiment of a sending back of at least one piece of web page information to a user process.

FIG. 9 is a flow chart illustrating an embodiment of a sending back of at least one piece of web page information to a user process. In some embodiments, the process 900 is used to implement 150 of process 100 and comprises:

In some embodiments, after obtaining the final search results, in other words, the final search information, the web page information is ranked and then output to the user.

In some embodiments, before being output to the user, the web page information is ranked based on corresponding query word weights.

In 910, for each piece of web page information, the server normalizes and calculates a total weight under a unitary standard based on the relevance weight of the web page information, the first translation weight, the second translation weight, or any combination thereof.

With regard to what is obtained:

(1) The server calculates the first translation weight for translation of the query words from the source language to query words in the various target languages. For example, the first translation weight corresponds to $p_1$.

(2) The server acquires the second translation weight for translations of web page information in the various target languages from the various target languages into the source language. For example, the second translation weight corresponds to $p_2$.

(3) The relevance weights between various pieces of web page information and the query words in corresponding languages. In other words, the relevance score $score_0$ is obtained through the linear regression fitting based on the above f1, f2, f3, f4, f5 and f6.

(4) The web page information quality score corresponds to $score_1$.

(5) Commercial score corresponds to $score_2$.

In some embodiments, the total weight for the web page information is calculated using Score=F ($score_0$, $score_1$, $score_3$)×$p_1$×$p_2$, where a linear regression model is referred to. For example, regarding Spanish query words identified from a Spanish-language user, in the event that the server translates the Spanish query words into English query words, the quality $p_1$ is calculated for the translation from Spanish query words to English query words, and the quality $p_2$ is calculated for the translation of an English web page information into a Spanish web page information. Then, the above other characteristics is used to calculate the total weight for the English web page information or for corresponding the translated Spanish web page information.

In 920, the server uses the total weight to rank each piece of web page information.

The web page information ultimately obtained in the source language is ranked according to the total weight.

In 930, the server sends the web page information to the user in accordance with the rankings.

FIG. 10 is a flow chart illustrating an embodiment of a sending of web page information to a user in accordance with a ranking process. The process 1000 is an implementation of operation 930 and comprises:

In 1010, the server removes weights from web page information whose identifier characteristic domain is the same in the web page information.

In some embodiments, in the event that some of the translated results from the eight different languages are very similar or identical, the similar or identical results are removed and the unique ones are retained.

For example, same or relatively similar products may exist in actual search results. For example, a company with multinational sales sells the same products in countries with different languages. The products differ only in the language of the product information. In such a case, the weights are removed. The weight removal principle includes filtering based on unique product IDs of seller products. For example, in the event that the product IDs are the same, the server selects the product ID which has the smaller file ID, as determined by the search engine.

Figure 11:
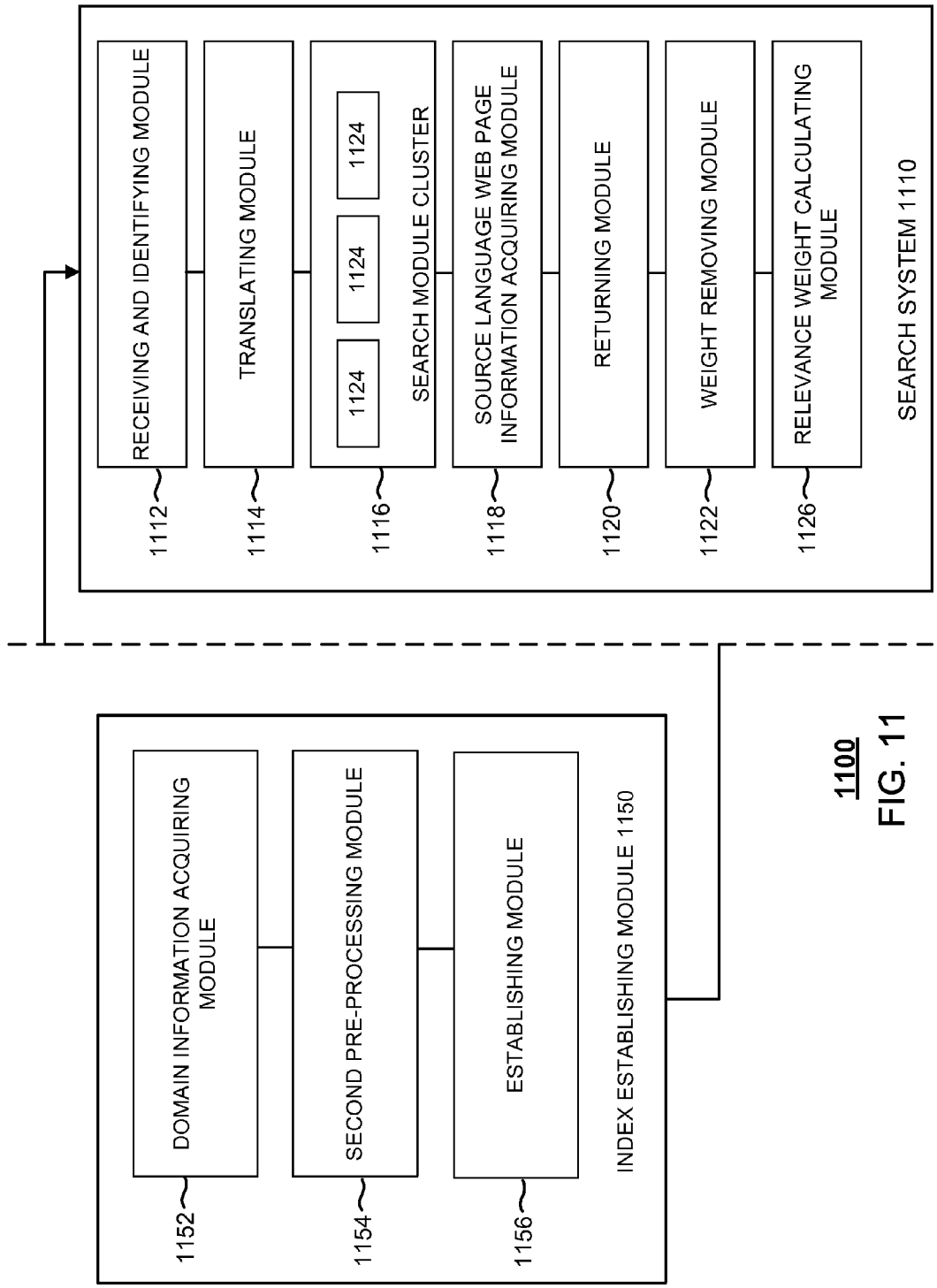
FIG. 11 is a structural diagram illustrating an embodiment of a multilingual mixed search system.

FIG. 11 is a structural diagram illustrating an embodiment of a multilingual mixed search system. The system 1100 includes a search system 1110 and an index establishing module 1150.

The search system 1110 includes a receiving and identifying module 1112, a translating module 1114, a search module cluster 1116, a source language web page information acquiring module 1118, and a returning module 1120.

The receiving and identifying module 1112 receives a query word entered by a user and identifies a source language of the query word.

The translating module 1114 translates the query word from the source language to a query word of various target languages, the various target languages being in languages other than the source language.

The search module cluster 1116 includes a plurality of search modules 1124. Each language corresponding to a different search module 1124. Each search module 1124 uses the query word corresponding to the language as a basis for searching indices of web page information of the corresponding language and obtains web page information in the corresponding language.

The source language web page information acquiring module 1118 acquires, from web page information obtained by indices corresponding to the various target languages, web page information translated from the various target languages to the source language.

The returning module 1120 sends back at least one piece of the obtained web page information to the user.

The index establishing module 1150 includes a domain information acquiring module 1152, a second pre-processing module 1154, and an establishing module 1156.

The domain information acquiring module 1152 acquires domain information for characteristic domains corresponding to the web page information in a language.

The second pre-processing module 1154 performs, with regard to the domain information for each characteristic domain, a normalization processing based on semantic rules for an associated language and obtains the smallest semantic unit in the associated language.

The establishing module 1156 establishes indices based on the smallest semantic units and the characteristic domains.

In addition, the translating module 1114 calculates a first translation weight for translating the query word from the source language to the query word in the various target languages, translates web page information in the various target languages from the various target languages into web page information in the source language, and calculates second translation weights for translations of web page information in the various target languages from the various target languages into the source language.

The search system 1110 further comprises a weight removing module 1122.

The weight removing module 1122 removes the weights from web page information whose identifier characteristic domain is the same in the web page information.

Figure 12A:
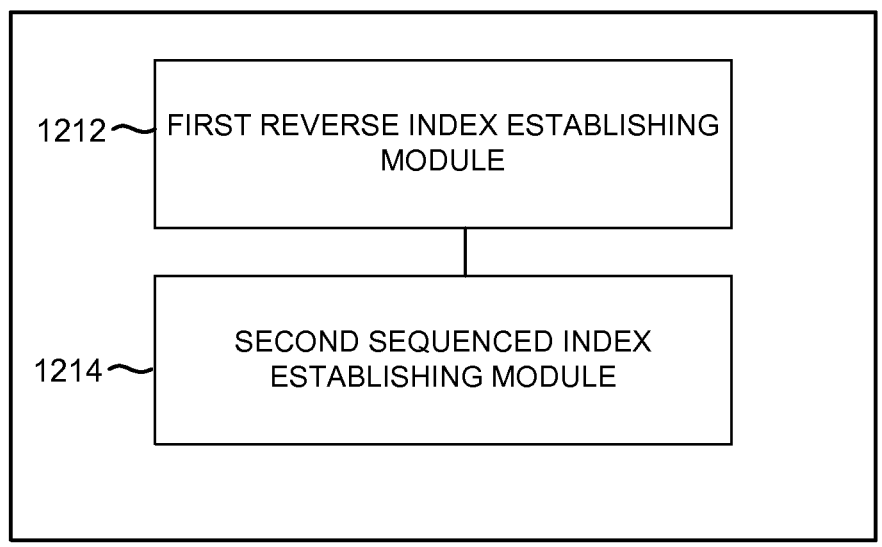
FIG. 12A is a structural diagram illustrating an embodiment of an establishing module.

FIG. 12A is a structural diagram illustrating an embodiment of an establishing module. The establishing module 1210 is an implementation of the establishing module 1156 and includes a first reverse index establishing module 1212 and a second sequenced index establishing module 1214.

The first reverse index establishing module 1212 uses the smallest semantic units to establish a first reverse index. The first reverse index is used to perform a preliminary query word based screening of web page information related to the query word.

The second sequenced index establishing module 1214 uses characteristic domains and the smallest semantic units in the corresponding characteristic domains to rank the characteristic domains to establish a second sequenced index. The second sequenced index is used further screen web page information relating to query word in the web page information from the preliminary screening.

Figure 12B:
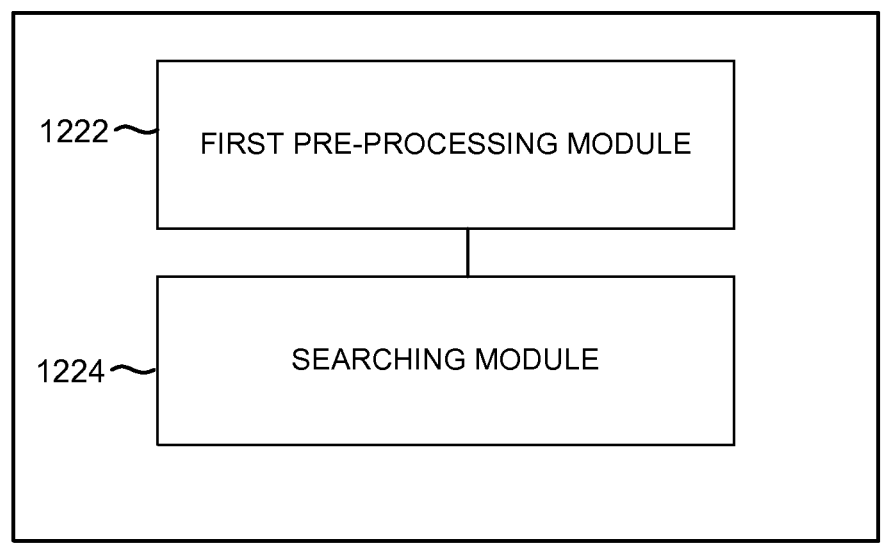
FIG. 12B is a structural diagram illustrating an embodiment of a search module.

FIG. 12B is a structural diagram illustrating an embodiment of a search module. The search module 1220 is an implementation of the search module 1124 and includes a first pre-processing module 1222 and a searching module 1224.

The first pre-processing module 1222 performs normalization processing on the query word of each language according to the semantic rules for that language and obtains the smallest semantic unit in that language.

The searching module 1224 uses the smallest semantic units in the various languages as a basis for searching indices of web page information in the corresponding languages and obtains web page information in the corresponding languages.

The search system 1110 further comprises a relevance weight calculating module 1126. The relevance weight calculating module 1126 calculates, with respect to web page information in each language, the relevance weight of the web page information and the query words in the corresponding language.

Figure 12C:
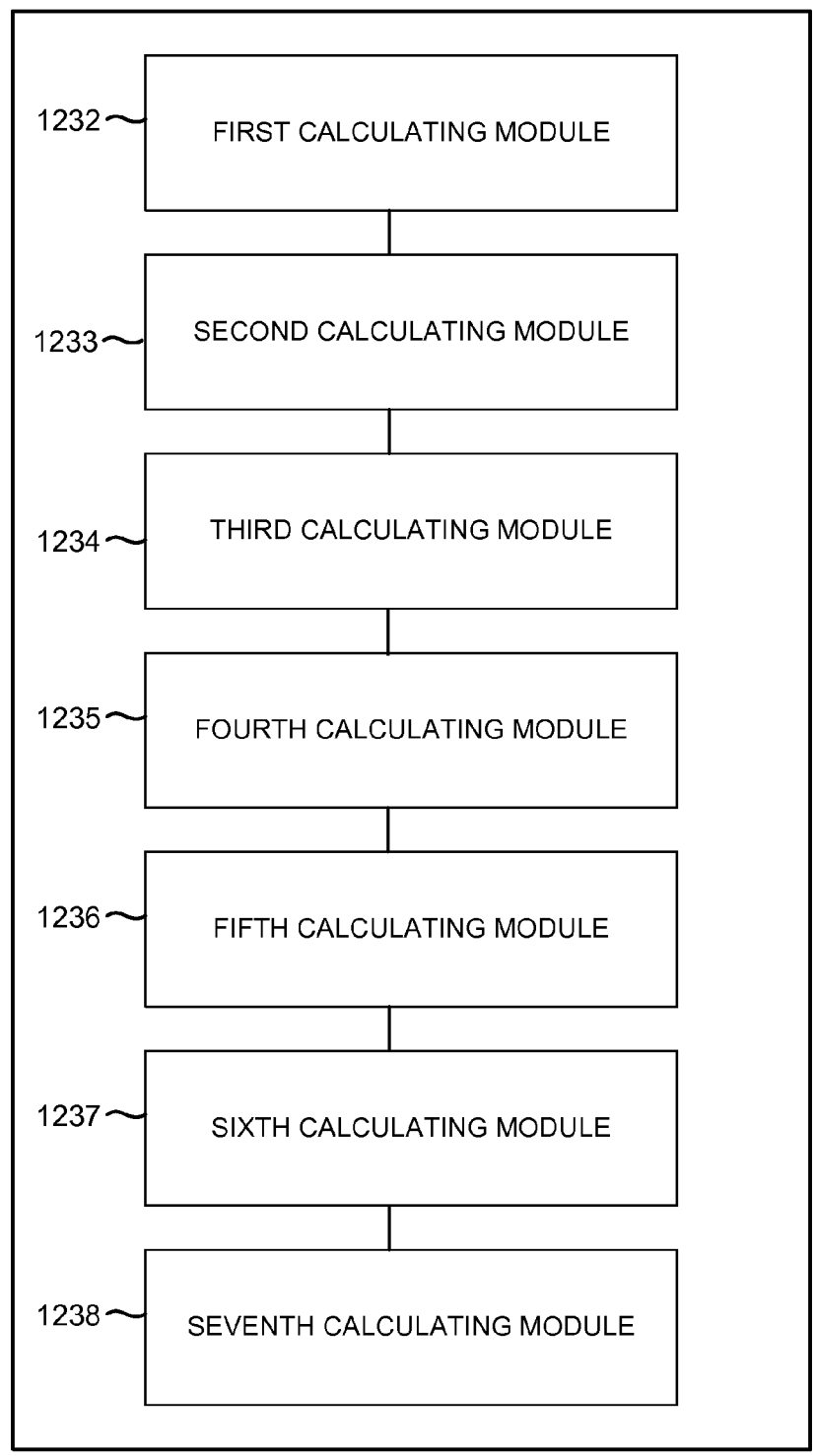
FIG. 12C is a structural diagram illustrating an embodiment of a relevance weight calculating module.

FIG. 12C is a structural diagram illustrating an embodiment of a relevance weight calculating module. The relevance weight calculating module 1230 is an implementation of the relevance weight calculating module 1126 and includes a first calculating module 1232, a second calculating module 1233, a third calculating module 1234, a fourth calculating module 1235, a fifth calculating module 1236, a sixth calculating module 1237, and a seventh calculating module 1238.

The first calculating module 1232 calculates a ratio f1 of a number of same words in the query word and in the title characteristic domain of the web page information to a number of words of the query word.

The second calculating module 1233 calculates a ratio f2 of a number of same words in the query word and in the title characteristic domain of the web page information to the number of words in the title characteristic domain.

The third calculating module 1234 calculates a ratio f3 of a number of smallest semantic unit corresponding to the query word to a number of smallest semantic unit of the title characteristic domain.

The fourth calculating module 1235 calculates a ratio f4 of number of query word to number of keywords of the keyword characteristic domain of the web page information.

The fifth calculating module 1236 calculates the match degree f5 between the smallest semantic unit series of the query word and the smallest semantic unit series of the title characteristic domain of the web page information.

The sixth calculating module 1237 calculates the match degree f6 between the smallest semantic unit series of the query words and the keyword series of the keyword characteristic domain of the web page information.

The seventh calculating module 1238 obtains the relevance weight through a linear regression fitting based on the f1, f2, f3, f4, f5 and f6.

Figure 12D:
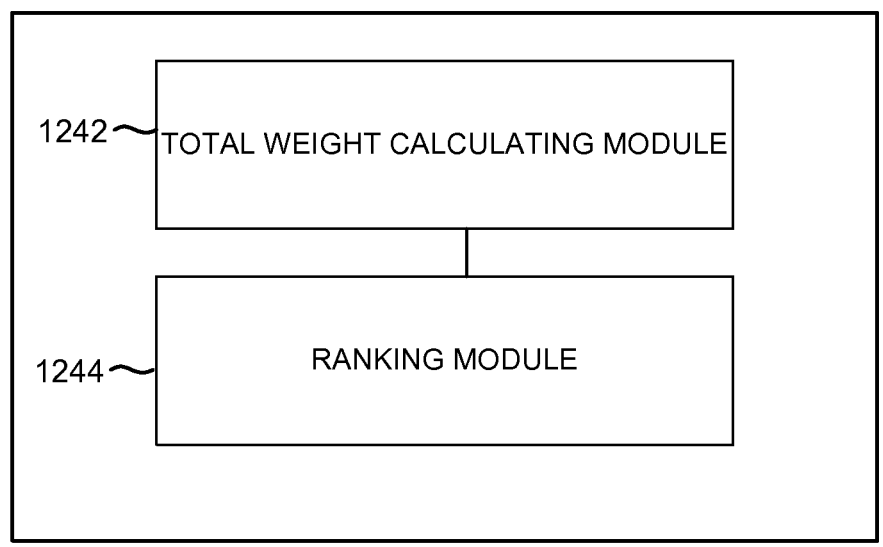
FIG. 12D is a structural diagram illustrating an embodiment of a returning module.

FIG. 12D is a structural diagram illustrating an embodiment of a returning module. The returning module 1240 is an implementation of the returning module 1120 and includes a total weight calculating module 1242 and a ranking module 1244.

The total weight calculating module 1242, for each piece of web page information, normalizes and calculates a total weight under a unitary standard based on the relevance weight of the web page information, the first translation weight, the second translation weight, or any combination thereof.

The ranking module 1244 ranks each piece of web page information based on the total weight.

Figure 13:
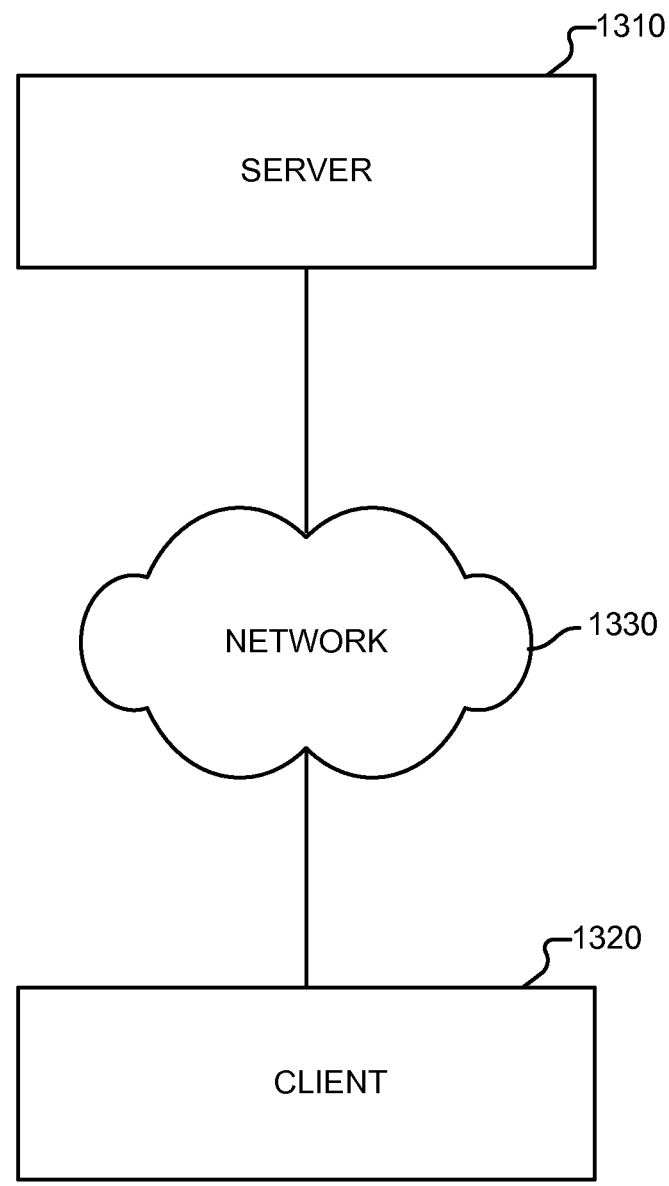
FIG. 13 is a schematic diagram of a multilingual mixed search system.

FIG. 13 is a schematic diagram of a multilingual mixed search system. The system 1300 includes a server 1310 connected to a client 1320 via a network 1330.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple subunits.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
 receiving a query word entered by a user and identifying source language of the query word, the source language being a natural language;
 translating, using a processor, the query word from the source language to query words of a plurality of target languages, the plurality of target languages being different than the source language;
 searching indices of web page information corresponding to the plurality of target languages based on the translated query words in the plurality of corresponding target languages to obtain web page information in the plurality of corresponding target languages, wherein the searching of the indices of web page information corresponding to the plurality of target languages comprises:
  acquiring domain information for characteristic domains corresponding to web page information in at least one target language, the characteristic domains including product information title, product information ID, product information keywords, product information attributes, product information categories, general description of the product information, detailed description of the product information, or any combination thereof;
  performing a normalization processing on the domain information based on semantic rules for the at least one target language and obtaining the smallest semantic unit in the at least one target language, the smallest semantic unit corresponds to a word or a phrase; wherein:
   the normalization processing includes one or more of: encoding processing, upper to lower case conversion, garbage character processing, improper character processing special character processing, division into sentences, division into words, reduction to word root, or elimination of tones; and establishing an index based on the characteristic domains and the smallest semantic unit in the corresponding characteristic domains; and searching the indices of the web page information corresponding to the plurality of target languages based on the smallest semantic unit in the plurality of target languages to obtain web page information in a corresponding target language, wherein the obtaining of the web page information in the corresponding target language comprises:

calculating a first relevance weight of web page information in a first target language and a query word in the first target language;

calculating a second relevance weight of web page information in a second target language and a query word in the second target language; and ranking web page information in the first and second target languages based on the first and second relevance weights to obtain the web page information in the corresponding target language;

from the web page information obtained from the indices corresponding to the plurality of target languages, translating, using the processor, the obtained web page information from the plurality of target languages to the source language; and sending back at least one piece of the obtained translated web page information to the user.

2. The method as described in claim 1, wherein the establishing of the index based on the characteristic domains and the smallest semantic unit in the corresponding characteristic domains comprises:

establishing a first reverse index based on the smallest semantic unit; and ranking the characteristic domains to establish a second sequenced index based on the characteristic domains and the smallest semantic unit in the corresponding characteristic domains.

3. The method as described in claim 1, the translating of the query word from the source language to the query words of the plurality of target languages comprises:

calculating a first translation weight for translation of the query word from the source language to the query words in the plurality of target languages.

4. The method as described in claim 1, wherein the translating of the web page information from the plurality of target languages to the source language comprises:

acquiring second translation weights for translations of the web page information from the plurality of target languages into the source language.

5. The method as described in claim 4, further comprising before the sending back of the at least one piece of the obtained translated web page information to the user:

for each piece of web page information, using a relevance weight of the web page information, a first translation weight, a second translation weight, or any combination thereof for normalizing and calculating of a total weight under a unitary standard; and using the total weight to rank each piece of web page information.

6. The method as described in claim 1, wherein the sending back of the at least one piece of the obtained translated web page information to the user comprises:

removing weights from web page information whose identifier characteristic domains are the same in the web page information.

7. A system, comprising:
at least one processor configured to:
receive a query word entered by a user and identifying source language of the query word, the source language being a natural language;

translate the query word from the source language to query words of a plurality of target languages, the plurality of target languages being different than the source language;

search indices of web page information corresponding to the plurality of target languages based on the translated query words in the plurality of corresponding target languages to obtain web page information in the plurality of corresponding target languages, wherein the searching of the indices of web page information corresponding to the plurality of target languages comprises to:

acquire domain information for characteristic domains corresponding to web page information in at least one target language, the characteristic domains including product information title, product information ID, product information keywords, product information attributes, product information categories, general description of the product information, detailed description of the product information, or any combination thereof;

perform a normalization processing on the domain information based on semantic rules for the at least one target language and obtaining the smallest semantic unit in the at least one target language, the smallest semantic unit corresponds to a word or a phrase; wherein:

the normalization processing includes one or more of: encoding processing, upper to lower case conversion, garbage character processing, improper character processing special character processing, division into sentences, division into words, reduction to word root, or elimination of tones; and establish an index based on the characteristic domains and the smallest semantic unit in the corresponding characteristic domains; and search the indices of the web page information corresponding to the plurality of target languages based on the smallest semantic unit in the plurality of target languages to obtain web page information in a corresponding target language, wherein the obtaining of the web page information in the corresponding target language comprises to:

calculate a first relevance weight of web page information in a first target language and a query word in the first target language;

calculate a second relevance weight of web page information in a second target language and a query word in the second target language; and rank web page information in the first and second target languages based on the first and second relevance weights to obtain the web page information in the corresponding target language;

from the web page information obtained from the indices corresponding to the plurality of target languages, translate the obtained web page information from the plurality of target languages to the source language; and send back at least one piece of the obtained translated web page information to the user; and a memory coupled to the at least one processor and configured to provide the at least one processor with instructions.

8. A computer program product being embodied in a non-transitory computer readable storage medium and comprising computer instructions for:
  receiving a query word entered by a user and identifying source language of the query word, the source language being a natural language;
  translating the query word from the source language to query words of a plurality of target languages, the plurality of target languages being different than the source language;
  searching indices of web page information corresponding to the plurality of target languages based on the translated query words in the plurality of corresponding target languages to obtain web page information in the plurality of corresponding target languages, wherein the searching of the indices of web page information corresponding to the plurality of target languages comprises:
    acquiring domain information for characteristic domains corresponding to web page information in at least one target language, the characteristic domains including product information title, product information ID, product information keywords, product information attributes, product information categories, general description of the product information, detailed description of the product information, or any combination thereof;
    performing a normalization processing on the domain information based on semantic rules for the at least one target language and obtaining the smallest semantic unit in the at least one target language, the smallest semantic unit corresponds to a word or a phrase; wherein:
      the normalization processing includes one or more of: encoding processing, upper to lower case conversion, garbage character processing, improper character processing special character processing, division into sentences, division into words, reduction to word root, or elimination of tones; and
    establishing an index based on the characteristic domains and the smallest semantic unit in the corresponding characteristic domains; and
    searching the indices of the web page information corresponding to the plurality of target languages based on the smallest semantic unit in the plurality of target languages to obtain web page information in a corresponding target language, wherein the obtaining of the web page information in the corresponding target language comprises:
      calculating a first relevance weight of web page information in a first target language and a query word in the first target language;
      calculating a second relevance weight of web page information in a second target language and a query word in the second target language; and
      ranking web page information in the first and second target languages based on the first and second relevance weights to obtain the web page information in the corresponding target language;
  from the web page information obtained from the indices corresponding to the plurality of target languages, translating the obtained web page information from the plurality of target languages to the source language; and
  sending back at least one piece of the obtained translated web page information to the user.

9. A method, comprising:
  receiving a query word entered by a user and identifying source language of the query word;
  translating, using a processor, the query word from the source language to query words of a plurality of target languages, the plurality of target languages being different than the source language;
  searching indices of web page information corresponding to the plurality of target languages based on the translated query words in the plurality of corresponding target languages to obtain web page information in the plurality of corresponding target languages, wherein the searching of the indices of web page information corresponding to the plurality of target languages comprises:
    performing a normalization processing on the query words of the plurality of target languages based on semantic rules for the plurality of target languages to obtain the smallest semantic unit in the plurality of target languages; and
    searching the indices of the web page information corresponding to the plurality of target languages based on the smallest semantic unit in the plurality of target languages to obtain web page information in a corresponding target language, wherein the obtaining of the web page information in the corresponding target language comprises:
      calculating a first relevance weight of web page information in a first target language and a query word in the first target language, wherein the calculating of the first relevance weight of the web page information and the query word in the first target language comprises:
        calculating a ratio f1 of a number of same words in the query word and in title characteristic domain of the web page information to a number of words in the query word;
        calculating a ratio f2 of a number of same words in the query words and in the title characteristic domain of the web page information to a number of words in the title characteristic domain;
        calculating a ratio f3 of a number of smallest semantic unit corresponding to the query word to a number of smallest semantic unit of the title characteristic domain;
        calculating a ratio f4 of a number of query word to a number of keywords of keyword characteristic domain of the web page information;
        calculating a match degree f5 between a smallest semantic unit series of the query word and the smallest semantic unit series of the title characteristic domain of the web page information;
        calculating a match degree f6 between the smallest semantic unit series of the query words and keyword series of the keyword characteristic domain of the web page information; and
        obtaining the first relevance weight through a linear regression fitting based on the f1, f2, f3, f4, f5 and f6;
      calculating a second relevance weight of web page information in a second target language and a query word in the second target language; and
      ranking web page information in the first and second target languages based on the first and second relevance weights to obtain the web page information in the corresponding target language;

from the web page information obtained from the indices corresponding to the plurality of target languages, translating, using the processor, the obtained web page information from the plurality of target languages to the source language; and sending back at least one piece of the obtained translated web page information to the user.

10. A system, comprising:

a processor; and a memory coupled with the processor, wherein the memory is configured to provide the processor with instructions which when executed cause the processor to:

receive a query word entered by a user and identifying source language of the query word;

translate the query word from the source language to query words of a plurality of target languages, the plurality of target languages being different than the source language;

search indices of web page information corresponding to the plurality of target languages based on the translated query words in the plurality of corresponding target languages to obtain web page information in the plurality of corresponding target languages, wherein the searching of the indices of web page information corresponding to the plurality of target languages comprises:

perform a normalization processing on the query words of the plurality of target languages based on semantic rules for the plurality of target languages to obtain the smallest semantic unit in the plurality of target languages; and search the indices of the web page information corresponding to the plurality of target languages based on the smallest semantic unit in the plurality of target languages to obtain web page information in a corresponding target language, wherein the obtaining of the web page information in the corresponding target language comprises:

calculate a first relevance weight of web page information in a first target language and a query word in the first target language, wherein the calculating of the first relevance weight of the web page information and the query word in the first target language comprises:

calculate a ratio f1 of a number of same words in the query word and in title characteristic domain of the web page information to a number of words in the query word;

calculate a ratio f2 of a number of same words in the query words and in the title characteristic domain of the web page information to a number of words in the title characteristic domain;

calculate a ratio f3 of a number of smallest semantic unit corresponding to the query word to a number of smallest semantic unit of the title characteristic domain;

calculate a ratio f4 of a number of query word to a number of keywords of keyword characteristic domain of the web page information;

calculate a match degree f5 between a smallest semantic unit series of the query word and the smallest semantic unit series of the title characteristic domain of the web page information;

calculate a match degree f6 between the smallest semantic unit series of the query words and keyword series of the keyword characteristic domain of the web page information; and obtain the first relevance weight through a linear regression fitting based on the f1, f2, f3, f4, f5 and f6;

calculate a second relevance weight of web page information in a second target language and a query word in the second target language; and rank web page information in the first and second target languages based on the first and second relevance weights to obtain the web page information in the corresponding target language;

from the web page information obtained from the indices corresponding to the plurality of target languages, translate the obtained web page information from the plurality of target languages to the source language; and send back at least one piece of the obtained translated web page information to the user.

11. A computer program product being embodied in a non-transitory computer readable storage medium and comprising computer instructions for:

receiving a query word entered by a user and identifying source language of the query word;

translating the query word from the source language to query words of a plurality of target languages, the plurality of target languages being different than the source language;

searching indices of web page information corresponding to the plurality of target languages based on the translated query words in the plurality of corresponding target languages to obtain web page information in the plurality of corresponding target languages, wherein the searching of the indices of web page information corresponding to the plurality of target languages comprises:

performing a normalization processing on the query words of the plurality of target languages based on semantic rules for the plurality of target languages to obtain the smallest semantic unit in the plurality of target languages; and searching the indices of the web page information corresponding to the plurality of target languages based on the smallest semantic unit in the plurality of target languages to obtain web page information in a corresponding target language, wherein the obtaining of the web page information in the corresponding target language comprises:

calculating a first relevance weight of web page information in a first target language and a query word in the first target language, wherein the calculating of the first relevance weight of the web page information and the query word in the first target language comprises:

calculating a ratio f1 of a number of same words in the query word and in title characteristic domain of the web page information to a number of words in the query word;

calculating a ratio f2 of a number of same words in the query words and in the title characteristic domain of the web page information to a number of words in the title characteristic domain;

calculating a ratio f3 of a number of smallest semantic unit corresponding to the query word to a number of smallest semantic unit of the title characteristic domain;

calculating a ratio f4 of a number of query word to a number of keywords of keyword characteristic domain of the web page information;

calculating a match degree f5 between a smallest semantic unit series of the query word and the smallest semantic unit series of the title characteristic domain of the web page information;

calculating a match degree f6 between the smallest semantic unit series of the query words and keyword series of the keyword characteristic domain of the web page information; and obtaining the first relevance weight through a linear regression fitting based on the f1, f2, f3, f4, f5 and f6;

calculating a second relevance weight of web page information in a second target language and a query word in the second target language; and ranking web page information in the first and second target languages based on the first and second relevance weights to obtain the web page information in the corresponding target language;

from the web page information obtained from the indices corresponding to the plurality of target languages, translating the obtained web page information from the plurality of target languages to the source language; and sending back at least one piece of the obtained translated web page information to the user.

* * * * *